United States Patent
Furukawa et al.

(10) Patent No.: US 7,239,868 B2
(45) Date of Patent: Jul. 3, 2007

(54) ELECTRIC DEVICE CAPABLE OF BEING CONTROLLED BASED ON DATA TRANSMITTED FROM CELLULAR PHONE

(75) Inventors: Akihiro Furukawa, Nagoyashi (JP); Koshi Fukazawa, Nagoyashi (JP); Kiyotaka Ohara, Nagoyashi (JP); Masaaki Hibino, Yotsukaichi (JP); Hideki Nogawa, Nagoyashi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 103 days.

(21) Appl. No.: 09/771,564

(22) Filed: Jan. 30, 2001

(65) Prior Publication Data

US 2001/0019953 A1 Sep. 6, 2001

(30) Foreign Application Priority Data

Feb. 1, 2000 (JP) ............................. 2000-023966
Feb. 2, 2000 (JP) ............................. 2000-025296

(51) Int. Cl.
*H04M 11/20* (2006.01)
*H04B 1/38* (2006.01)

(52) U.S. Cl. ...................... 455/420; 455/557; 455/418; 455/419

(58) Field of Classification Search ................ 455/420, 455/418, 419, 28, 151.4, 92, 123, 161.2, 455/557, 79, 563, 575, 66, 151.1, 352, 556
See application file for complete search history.

(56) References Cited

U.S. PATENT DOCUMENTS 6,094,277 A * 7/2000 Toyoda ...................... 358/1.15
6,173,338 B1 * 1/2001 Fukuta .......................... 710/5
6,223,029 B1 * 4/2001 Stenman et al. ............. 455/420
6,522,421 B2 * 2/2003 Chapman et al. ........... 358/1.15
6,591,094 B1 * 7/2003 Bentley ...................... 455/405

FOREIGN PATENT DOCUMENTS

| JP | A-9-37084 | 2/1997 |
|---|---|---|
| JP | A-11-98303 | 4/1999 |
| JP | 11-239238 | 8/1999 |
| JP | A 11-284757 | 10/1999 |
| JP | A-11-316658 | 11/1999 |
| WO | PCT/US 94/26059 | * 4/1994 |

OTHER PUBLICATIONS

PCT/US94/04353.*
Japanese translation of Office Action issued to JP 2000-023966 on Oct. 4, 2005.

* cited by examiner

*Primary Examiner*—Naghmeh Mehrpour
(74) *Attorney, Agent, or Firm*—Oliff & Berridge, PLC

(57) ABSTRACT

An electric device includes a read only memory (ROM) storing a condition setting program which sets operation conditions and the like of the electric device in accordance with data. When a user changes the operation conditions and the like of the electric device, the user access a homepage of the electric device from his or her own cellular phone, inputs necessary information and command through the cellular phone. When the electric device receives the command, the condition setting program sets the operation conditions in accordance with the received command.

23 Claims, 17 Drawing Sheets

FIG. 15

```
Subject: Private Document "Annual Report [00001]"  ——37
Date:    Tue, 30 Nov. 1999 11:08:15+0900
From:    Printer1@brother.co.jp
To:      Tom@keitai.brother.co.jp Message: Tom, your private document "Annual Report"
is spooled and ready to print. Reply your password
to start print this document.

PASSWORD=
<Reply>
```

FIG. 16

```
To:      Printer@brother.co.jp
(From:   Tom@keitai.brother.co.jp)
Subject: Re:Private Document "Annual Report [00001]"
Date:    Tue, 30 Nov. 1999 11:08:25+0900

Message: Tom, your private document "Annual Report"
is spooled and ready to print. Reply your password
to start print this document.

PASSWORD= ******
```

FIG. 17

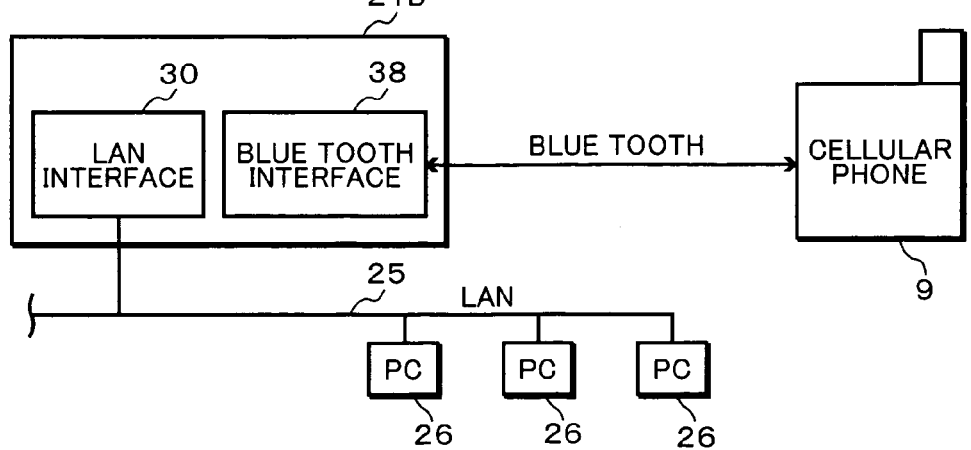

FIG.24

```
To:       Admin-Printer1@brother.co.jp
(From:    Tom@keitai.brother.co.jp)
Subject:  Re:Re:Administrator Setting
Date:     Tue, 30 Nov. 1999 11:08:30+0900

TONER SAVE MODE= ON
```
~45

FIG.25

```
Subject:  Re:Re:Re:Administrator Setting[00001]
Date:     Tue, 30 Nov. 1999 11:08:35+0900
From:     Admin-Printer1@brother.co.jp
To:       Tom@keitai.brother.co.jp Message: Tom, accepted your configuration request.
Current settings are:

POWER SAVE MODE= ON

TONER SAVE MODE= ON
```
~46

ELECTRIC DEVICE CAPABLE OF BEING CONTROLLED BASED ON DATA TRANSMITTED FROM CELLULAR PHONE

BACKGROUND OF THE INVENTION

1. Field of the Invention

The present invention relates to electric devices that require input of settings, commands, and the like.

2. Description of the Related Art

Recently, almost all electric devices include some sort of an operation enabling a user to select and set desired operation conditions and the like. For most electric devices, such as a printer or a sewing machine, the operation panel has a simple configuration including only the minimum required operation keys.

However, some commands and the like can not be input through the operation panel because the operation panel has only the minimum required simple configuration. For example, the user will be unable to input a password that include alphabet letters if the operation panel is not provided with alphabet keys or similar mechanism. In this case, the user can connect an external device to the electric device, and user the eternal device to set operation conditions and the like of the electric device. The external device may include, in addition to the minimum required operation keys, a monitor display, alphanumeric keys, and the like.

However, the external unit is manufactured as a separate component from the main body of the electric devices. Accordingly, a number of components increases, so the manufacturing costs increase. Also, a connection member is required to connect the external unit to the main body. Also, the external unit occupies additional space, which prevents from providing a compact sized electric device.

There has been also provided a system including a plurality of personal computers (PC) and a plurality of printers connected to each other via a network, such as local area network (LAN), Internet, or the like. In some cases, the printers connected to such a network are provided with a function to communicate with a remote device via e-mail. For example, the printer can send an e-mail message to a predetermined address so as to notify a user that requested printing has been completed or that an error has occurred during printing operations. Alternatively, a user of the PC can send a print job to the printer using e-mail. In this case, the user can include his or her own e-mail address or any other e-mail address in the e-mail message, so that the printer sends an e-mail message to the specified e-mail address or addresses when necessary.

However, when the user sends a print job to the printer via a communication method other than e-mail, such as via LPR in a pier-to-pier manner or via a server other than a mail server, such as Windows NT$^{RT}$ or Netware$^{RT}$, then the user cannot notify his or her own e-mail address to the printer. Therefore, the printer can not send any e-mail message to the user.

Also, the printer generates and sends an e-mail message in accordance with a special print protocol which s based on e-mail protocol. Accordingly, the personal computers need to be provided with a port monitor software that supports the special print protocol, or else the personal computer will be unable to receive the e-mail message from the printer.

SUMMARY OF THE INVENTION

It is an objective of the present invention to overcome the above-described problems, and also to provide electric devices and image forming devices which have a simple configuration, require less spaces, and are manufactured at low costs.

It is also an objective of the present invention to provide an image forming device having a simple configuration capable of sending an e-mail message in response to a print job which has been transmitted via any means other than e-mail.

In order to achieve the above and other objectives, there is provided an electric device communicable with a cellular phone. The electric device includes a control unit that executes operations based on control data transmitted from the cellular phone.

There is also provided an image forming device including a receiving unit, a detecting unit, and an output unit. The receiving unit receives data from an external device by means other than e-mail, the data including an e-mail address. The detecting unit detects an e-mail address from the data. The output unit outputs an e-mail message to the e-mail address.

There is also provided a system including a print data generating unit and an image forming unit. The print data generating unit includes a generating unit that generates print data including document data and command data, the command data including an e-mail address; and a communication unit that transmits the print data by means other than e-mail. The image forming unit includes a receiving unit that receives the print data from the print data generating unit; and a detecting unit that detects the e-mail address from the command data.

Further, there is provided a control method of controlling an electric device. The control method includes the steps of receiving data transmitted from a cellular phone, and controlling a control unit of the electric device in accordance with the received data.

Moreover, there is provided a control method of controlling an image forming device. The method includes the steps of a) receiving print data from an external device, b) storing the print data in a memory, and c) executing printing of the print data when a predetermined password is received from a cellular phone.

BRIEF DESCRIPTION OF THE DRAWINGS

The above and other objects, features and advantages of the present invention will become more apparent from the following description when taken in conjunction with the accompanying drawings, in which:

FIG. 15 is a plan view of an e-mail message sent from the printer to a cellular phone of FIG. 14;

FIG. 16 is a plan view of an e-mail message sent from the cellular phone to the printer of FIG. 14;

FIG. 17 is a block diagram of a printer as an example of the electric device of FIG. 5;

FIG. 24 is a plan view of an e-mail message changed from the e-mail message of FIG. 23 by a user;

FIG. 25 is a plan view of an e-mail message sent from the printer to the cellular phone in response to the e-mail message of FIG. 24;

DETAILED DESCRIPTION OF THE PREFERRED EMBODIMENTS

Next, electric devices according to embodiments of the present invention will be described while referring to the accompanying drawings. It should be noted that the electric devices of the present invention include a control unit which is controlled by a cellular phone. Here, electric devices according to the present invention are defined as devices which include electric components. Examples of the electric devices include industrial devices both for offices and household use, such as image forming devices and sewing machines. Image forming devices include printers, facsimile machines, scanners, and the like.

Figure 1:
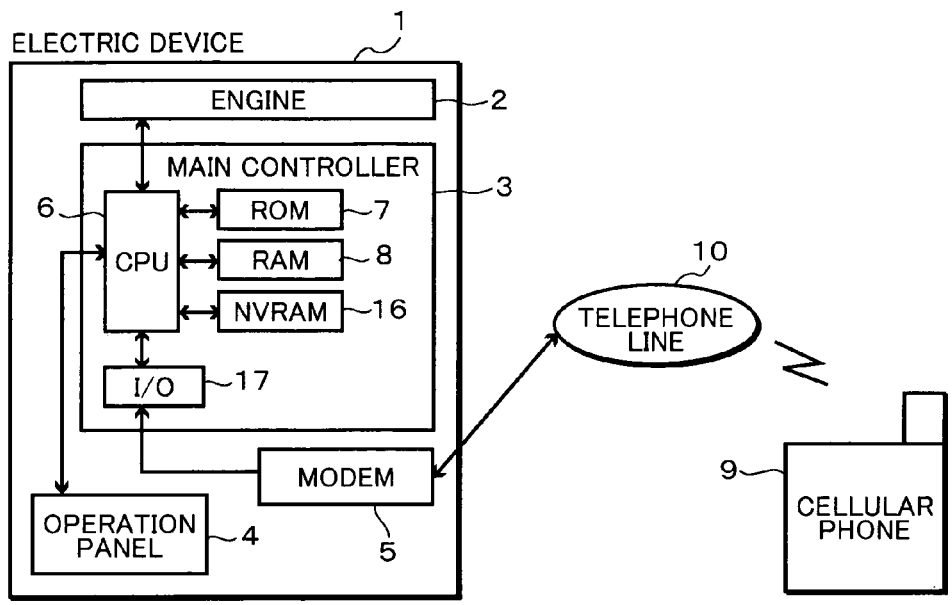
FIG. 1 is a block diagram showing an electric device according to an embodiment of the present invention.

FIG. 1 shows an overall configuration of an electric device 1 according to an embodiment of the present invention. As shown in FIG. 1, the electric device 1 includes an engine 2, a main controller 3, an operating portion 4, and a modem 5. The main controller 3 includes a central processing unit (CPU) 6, a read only memory (ROM) 7, a random access memory (RAM) 8, a non-volatile random access memory (NVRAM) 16, and an input/output (I/O) controller 17. Each of the engine 2, the ROM 7, the RAM 8, the NVRAM 16, the I/O controller 17, the operating portion 4, and the modem 5 is connected to the CPU 6.

The engine 2 includes mechanical components (not shown) corresponding to operations of the electric device 1. The operating portion 4 is provided with operation keys, numeral keys, and the like (not shown) through which a user inputs operation commands and the like. The modem 5 is connected to a telephone line 10 and transmits and receives data to and from a cellular phone 9 via the telephone line 10. The ROM 7 stores a variety of programs for operating the electric device 1. The program includes a condition setting program, e-mail communication program, e-mail address detecting program, and any other appropriate programs. The condition setting program sets operation conditions and the like of the electric device 1 based on information received from the cellular phone 9. The condition setting program includes an audio guide program to be described later for aiding the user of the cellular phone 9. The RAM 8 includes a memory for temporarily storing values required to execute the variety of programs. The NVRAM 16 includes a region for storing setting values set by the programs.

The cellular phone 9 is a mobile telephone which can be carried around. Examples of the cellular phone include a normal cellular phone and a telephone integrally provided with a mobile information apparatus, such as a Personal Handy Phone (PHS) and a Personal Digital Assistant (PDA). The cellular phone 9 is provided with a monitor, an operation panel, a back light unit, and an audio output unit. The operation panel includes alphanumerical keys and operation keys. The cellular phone 9 is also provided with a browser so that a user of the cellular phone 9 can access a Web homepage via Internet and the like, and also send and receive e-mail messages to and from a remote device.

In the present embodiment, the cellular phone 9 is owned by the user of the electric device 1.

Next, operation to control the condition setting program of the electric device 1 through the cellular phone 9 will be described.

First, the user makes a telephone call to the electric device 1 from the cellular phone 9, and a signal is transmitted from the cellular phone 9 and received by the electric device 1 at the modem 5 via the telephone line 10. When the CPU 6 detects the signal, then the CPU 6 executes the audio guide program stored in the ROM 7. The audio guide program outputs a predetermined audio guidance to the cellular phone 9 via the modem 5 and the telephone line 10. The user of the cellular phone 9 listens to the audio guidance, and then inputs a desired command through the operation panel of the cellular phone 9 in accordance with the audio guidance. When the command is transmitted to the electric device 1, the condition setting program sets the operation conditions and the like in accordance with the received command. In this way, the user can select and set the operation conditions and the like of the electric device 1 through the cellular phone 9.

As described above, according to the present invention, there is no need to provide an additional external operation panel to the electric device 1 because the user can select and set the operation conditions and the like of the electric device 1 even if the user cannot set the operation conditions through the operation panel 4. Accordingly, manufacturing costs and a number of components of the electric device 1 can be reduced, and space can be saved.

Also, because the communication between the electric device 1 and the cellular phone 9 can be achieved via the modem 5, there is no need to provide an additional communication unit to the electric device 1. This simplifies the communication configuration of the electric device 1, Further, because the communication is achieved via the telephone line 10, there is no need to provide a communication line between the electric device 1 and the cellular phone 9. That is, the communication requires only a simple configuration and reduced cost.

It should be noted that the telephone line 10 can be either a public telephone line or a private telephone line provided in offices.

Figure 2:
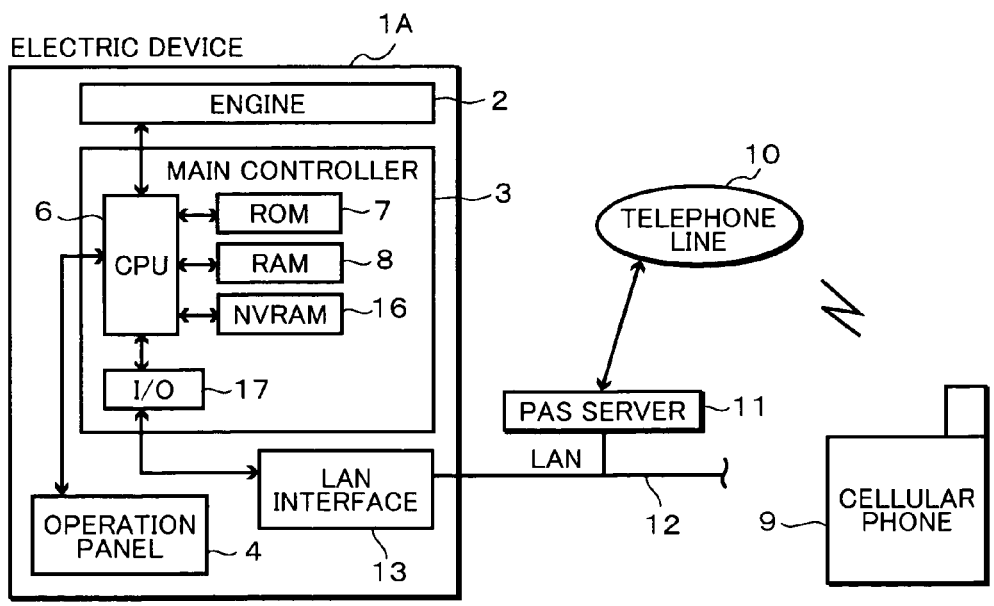
FIG. 2 is a block diagram showing an electric device according to a first modification of the embodiment of the present invention.

Next, an electric device 1A according to a first modification of the embodiment will be described while referring to FIG. 2. The electric device 1A of the first modification differs from the electric device 1 in that the electric device 1A includes a local area network (LAN) interface 13 instead of the modem 5. The LAN interface 13 is connected to a LAN 12 which is in turn connected to a Remote Access Service (RAS) server 11. The RAS server 11 is connected to the telephone line 10. The RAS server 11 enables the communication between the electric device 1A and the cellular phone 9. A Web server application is stored in the ROM 7 of the electric device 1A.

With this configuration, the user controls the condition setting program through the cellular phone 9 in the following manner. That is, the user designates a uniform resource locator (URL) of the electric device 1A and makes a telephone call to the electric device 1A. Then, a signal is transmitted to the RAS server 11 via the telephone line 10, and remote-logs in the LAN 12. The signal is sent to the LAN interface 13 via the LAN 12 in accordance with the designated URL. When the CPU 6 detects the signal, then the CPU 6 executes the Web server application and transmits a homepage data to the cellular phone 9 via the LAN interface 13, the LAN 12, the RAS server 11, and the telephone line 10. The monitor of the cellular phone 9 displays a homepage of the electric device 1A based on the homepage data, and the user accesses a predetermined Web-page from the homepage. When, the user inputs a command through the cellular phone 9 while referring to the displayed Web-page, the command is then transmitted to and received by the electric device 1. The condition setting program sets the operation conditions and the like in accordance with the received command.

As described above, according to the present invention, the electric device 1A achieves communication with the cellular phone 9 via the RAS server 11 and the LAN interface 13 in a manner of remote-log-in. Therefore, a variety of information can be transmitted in a variety of forms between the electric device 1A and the cellular phone 9. Further, because the user can access the homepage of the electric device 21A by using a Web service from the browser of the cellular phone 9, the user can control the condition setting program to set desired operation conditions and the like of the electric device 1A in a simple and fast manner.

Figure 3:
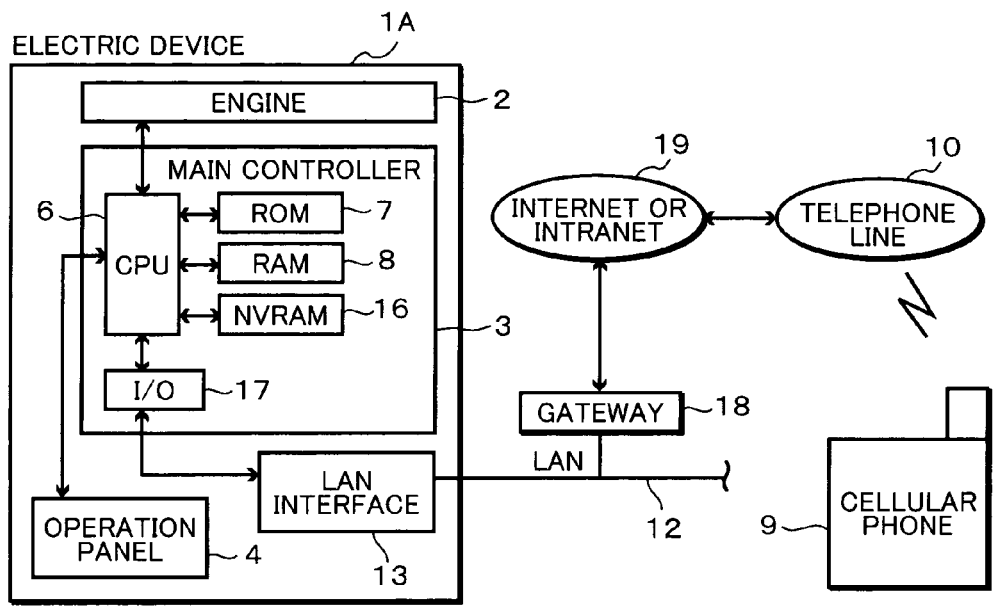
FIG. 3 is a block diagram showing the electric device of FIG. 2 connected to a gateway and the Internet or the Intranet.

Alternatively, as shown in FIG. 3, the electric device 1A can be connected to a gateway 18 and an Internet or Intranet 19 via the LAN 12, instead of the RAS server 11. In this case, the user accesses the homepage of the electric device 1A from the cellular phone 9 via the telephone line 10, the Internet or Intranet 9, the gateway 18, and the LAN 12.

Figure 4:
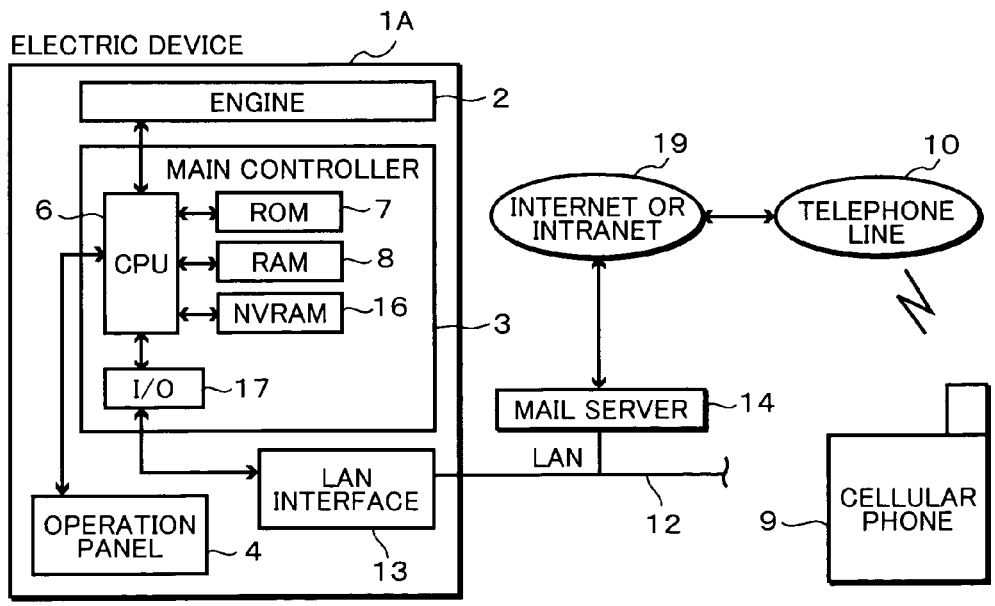
FIG. 4 is a block diagram showing the electric device of FIG. 2 connected to a mail server and the Internet or Intranet.

Still alternatively, as shown in FIG. 4, the electric device 1A can be connected to a mail server 14 and the Internet or Intranet 19 via the LAN 12. In this case the ROM 7 stores a support application for supporting a Post Office Protocol-Version3 (POP3) and a simple Mail transfer Protocol (SMTP). The POP3 and the SMTP serve as a mail-transmission protocol and a mail-receiving protocol, respectively. A mail account and a mail address of the electric device 1A are registered in the mail server 14.

In this case, the user controls the condition setting program of the electric device 1A to set the operation conditions through the cellular phone 9 in the following manner. That is, the user prepares an e-mail message requesting operation condition settings, designates the e-mail address of the electric device 1A, and sends the e-mail message. Then, the e-mail message is received by the mail sever 14 via the telephone line 10 and the Internet or Intranet 19. Because the support application is provided to the electric device 1A, the LAN interface 13 receives the e-mail message from the-mail message server 14 via the LAN 12. When the CPU 6 detects the e-mail message, then the CPU 6 executes the condition setting program to acquire current operation conditions, prepare an e-mail message indicating the current operation conditions, and send the e-mail message to the cellular phone 9 via the LAN interface 13, the LAN 12, the mail sever 14, the Internet or the Intranet 19, and the telephone line 10. Next, the user prepares a reply e-mail message indicating settings of the operation conditions through the operation panel of the cellular phone 9 while referring to the received e-mail message, and sends the reply e-mail message to the electric device 1A. When the electric device 1A receives the reply e-mail messages, the condition setting program sets the operation conditions based on the reply e-mail message, so the electric device 1A performs operations under the operation conditions.

As described above, the electric device 1A achieves communication with the cellular phone 9 via the LAN interface 13 and the mail server 14 using e-mail messages, and the operation conditions of the electric device 1A can be selected and set based on the e-mail messages. Accordingly, the settings of the operation conditions of the electric device 1A can be performed in a simple and reliable manner.

It should be noted that, as will be described later, an identification (ID) code is preferably appended to e-mail messages exchanged between the electric device 1A and the cellular phone 9 in order to indicate that the e-mail messages are a series of e-mail messages and also to distinguish the e-mail messages from any other e-mail messages. That is, by appending an identical ID code to each of a series of e-mail messages, the e-mail messages can be easily distinguished from other e-mail messages exchanged between the cellular phone 9 and any other electric devices at the same time. Accordingly, the e-mail messages can be reliably processed without being misread, and the electric device 1A can be reliably controlled.

Figure 5:
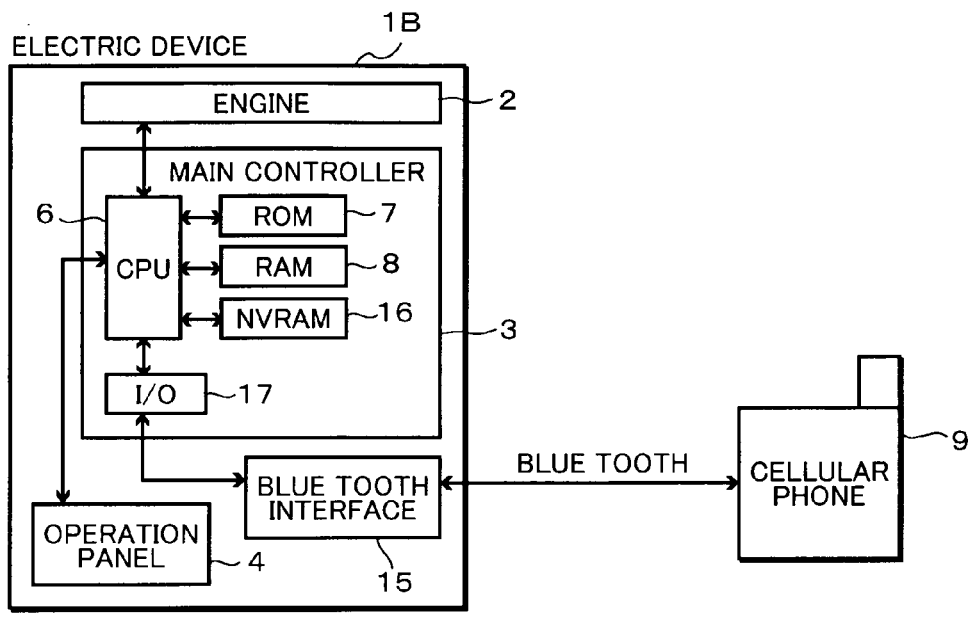
FIG. 5 is a block diagram showing an electric device according to a second modification of the embodiment.

Next, an electric device 1B according to a second modification of the embodiment will be described while referring to FIG. 5. The electric device 1B is similar to the above-described electric device 1 except that the electric device 1B is provided with a BlueTooth interface 15 instead of the modem 5. The BlueTooth interface 15 is connected to BlueTooth, so the electric device 1B is communicable with the cellular phone 9 via the BlueTooth.

In this configuration, first, the user connects a line between the cellular phone 9 and the electric device 1B via BlueTooth in a well-known manner. When the line is connected, a signal is transmitted from the cellular phone 9 to the electric device 1B via the BlueTooth. When the CPU 6 detects the signal, then the CPU 6 executes the condition setting program and outputs a predetermined information to the cellular phone 9. The information indicates necessary information required for setting operation conditions of the electric device 1B. Then, the user inputs a command through the operation panel of the cellular phone 9 while referring to the information. The command is transmitted to the electric device 1B. The condition setting program sets the operation conditions of the electric device 1B based on the command, and the process is completed.

The operations described above while referring to FIGS. 1 to 5 are preferably used when controlling an image forming device to output confidential information. Next, specific examples where the present invention is applied to printers will be described while referring to FIGS. 6 to 30.

Figure 6:
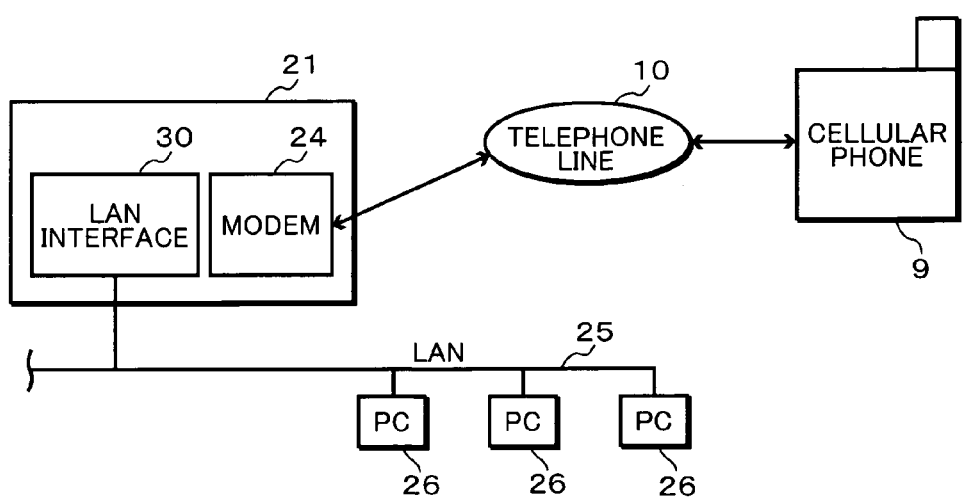
FIG. 6 is a block diagram showing a printer as an example of the electric device of FIG. 1.
Figure 7:
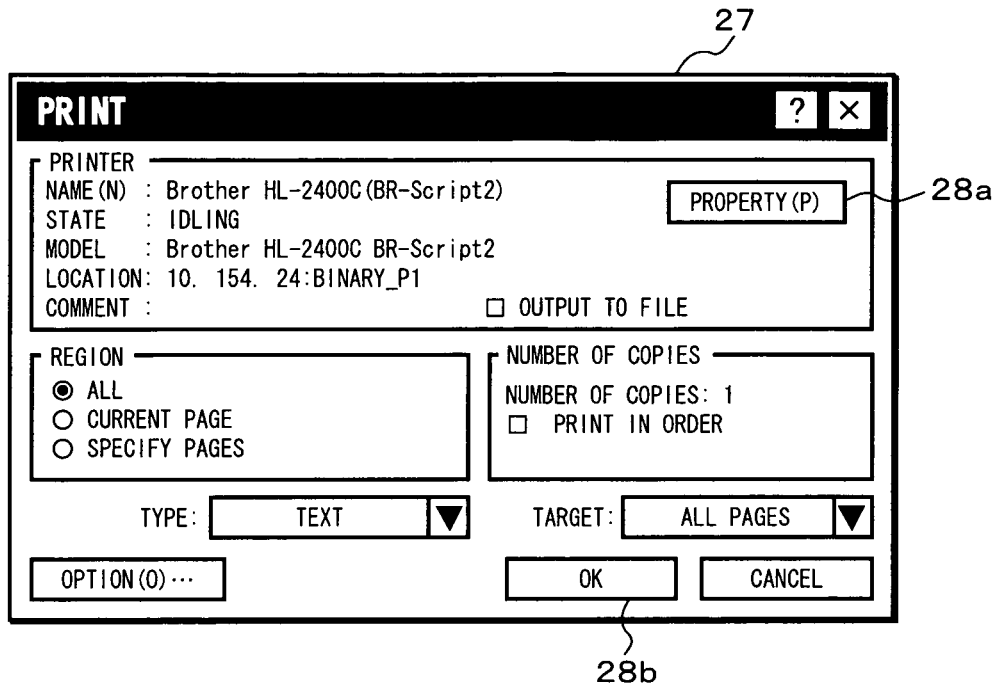
FIG. 7 is a plan view showing a print dialog window which is displayed on a monitor of a personal computer shown in FIG. 6.

First, a first example will be described for the electric device 1 shown in FIG. 1 while referring to FIGS. 6 to 8 and a flowchart in FIG. 26. A printer 21 shown in FIG. 6 is a multifunction center (MPC) type printer provided with a facsimile function, a scanner function, a printer function, and the like. The printer 21 includes a modem 24 and a LAN interface 30. The LAN interface 30 is connected to a LAN 25 on which a plurality of personal computers (PC) 26 are provided. Although not shown in the drawings, the printer 21 is also provided with a CPU, a ROM, a RAM, and a NVRAM. The ROM stores a variety of programs for controlling the printer 21, and the above-described condition setting program. The condition setting program includes the audio guide program for outputting an audio guidance.

With this configuration, first, a user of one of the PC 26 prepares a confidential document by using an application provided to the PC 26, such as a word processing software. Then, the user controls the PC 26 to display a print dialog window 27 shown in FIG. 7, and sets desired print conditions on the print dialog window 27.

Figure 8:
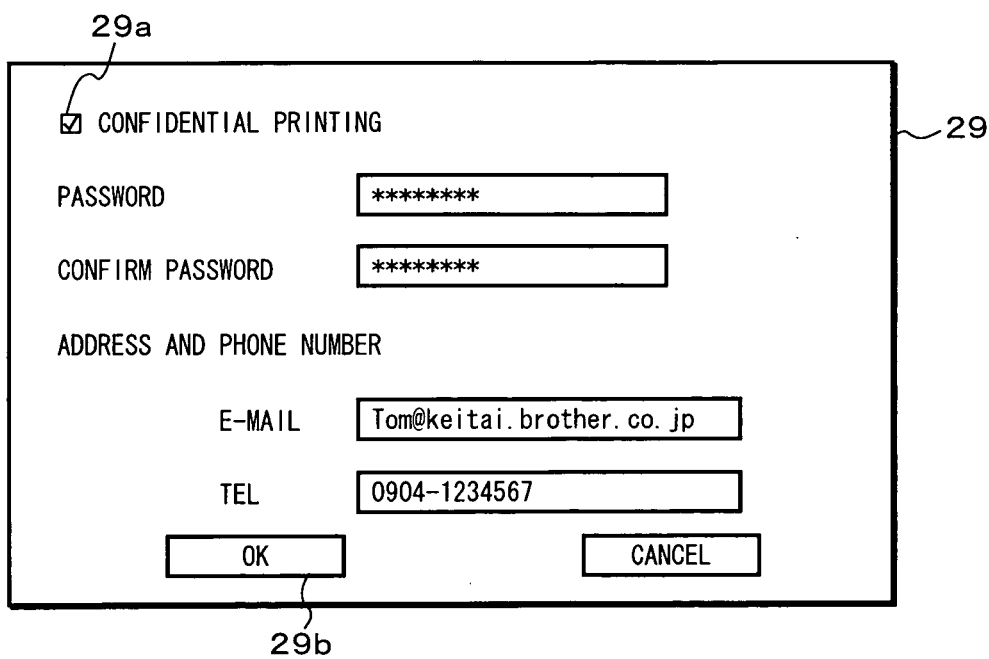
FIG. 8 is a plan view showing a setting dialog window displayed on the monitor of the personal computer when a property button on the print dialog window of FIG. 7 is pressed.
Figure 9:
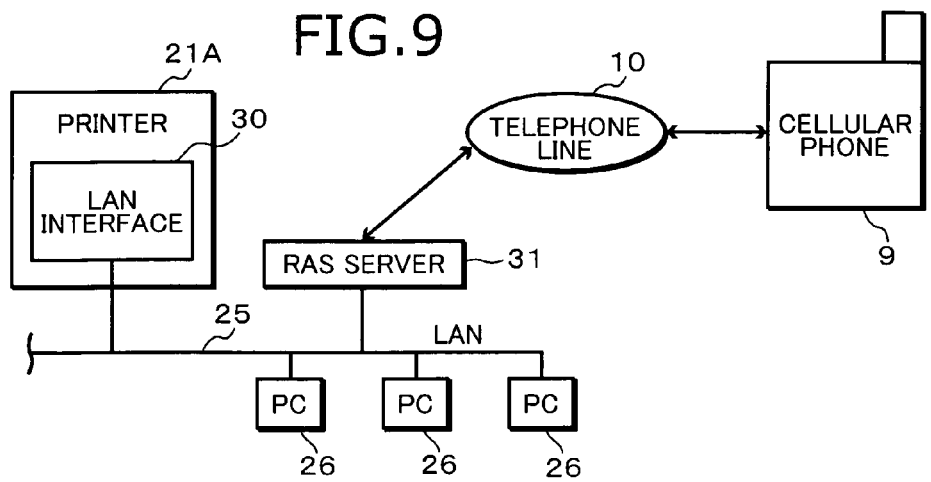
FIG. 9 is a block diagram of a printer as an example of the electric device of FIG. 2.
Figure 10:
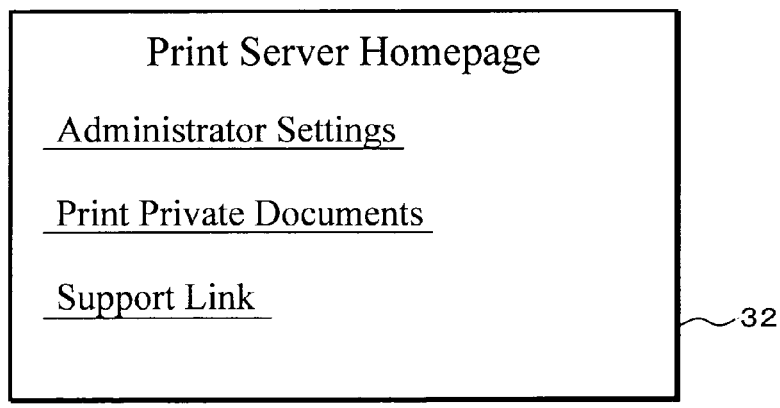
FIG. 10 is a plan view showing a homepage of the printer of FIG. 9.
Figure 11:
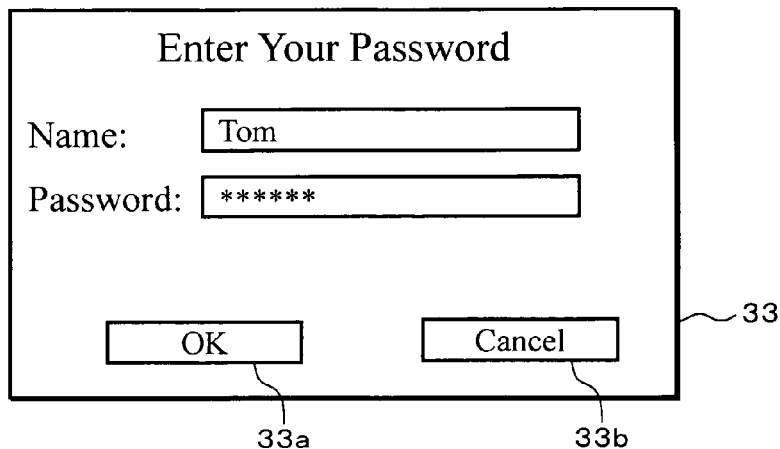
FIG. 11 is a plan view of a window which is displayed when PRINTPRIVATE DOCUMENTS on the homepage of FIG. 10 is selected.
Figure 12:
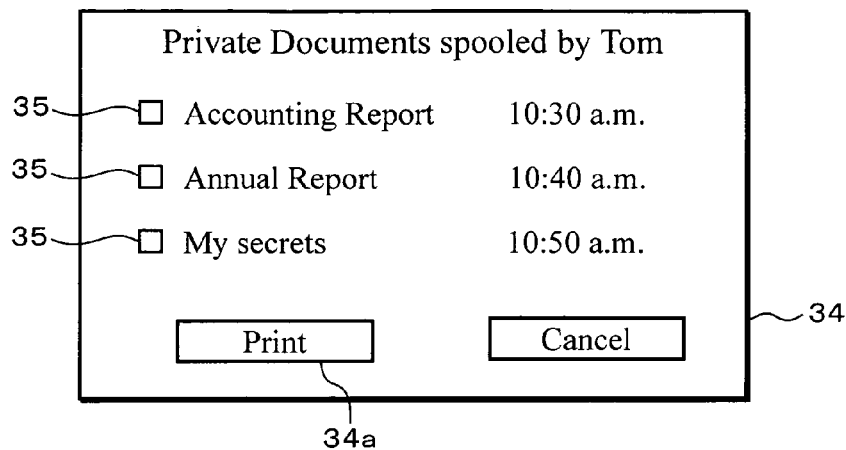
FIG. 12 is a plan view of a list window included in the homepage of FIG. 10.

When the user presses a property button 28a on the print dialog window 27, then the PC 26 displays a setting dialog window 29 shown in FIG. 8. Then, the user checks a check box 29a to indicate that the current document is a confidential document. Next, the user inputs his or her own password, e-mail address, and telephone number. The password can include only numbers, only alphabet letters, or both numbers and alphabet letters. It should be noted that in the present and following example, it is assumed that the cellular phone 9 is owned by the user of the PC 26, so the user inputs the telephone number of the cellular phone 9 at this time.

Then, the user presses an OK button 29b, so the display returns to the print dialog window 27 of FIG. 8. The user inputs further necessary information on the print dialog window 27. When, the user presses an OK button 28b, then print data is transmitted to the printer 21 via the LAN 25. The print data indicates printing of the confidential document and is appended with command data. The command data indicates information including the telephone number, the e-mail address, and the like which are input on the setting dialog window 29. The command data also indicates that the print data is confidential print data.

Figure 26:
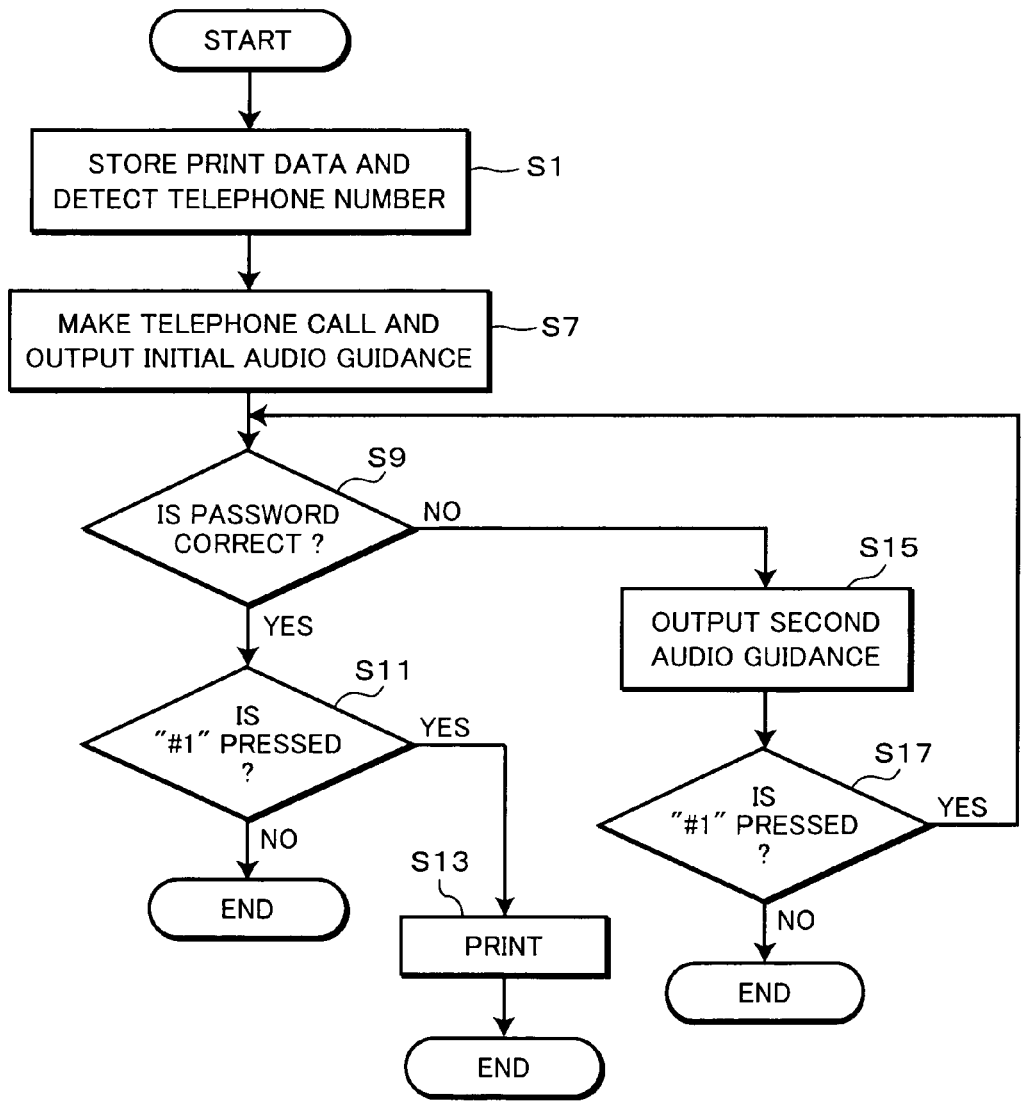
FIG. 26 is a flowchart representing a process executed in the printer of FIG. 6.

When the printer 21 receives the confidential print data, the printer 21 executes a process represented by the flowchart of FIG. 26. Once the process is started, first the print data is stored into the RAM or the non-volatile memory, such as NVRAM or HDD, of the printer 21, and also the telephone number is detected from the command data (S1). Then, the condition setting program is executed to make a telephone call to the detected telephone number, that is, to the cellular phone 9 in this example, and outputs an initial audio guidance announcing "CONFIDENTIAL DOCUMENT PRINTING IS READY. TO EXECUTE THIS PRINTING, INPUT YOUR PASSWORD, THEN PRESS '#1'. TO CANCEL THIS PROCESS, PRESS '#0'" (S7). In this way, the user is notified that printing of the confidential document is ready to be performed.

Next, the user may set the cellular phone 9 in a hold mode if he or she wishes, then the user walks to the printer 21. When the user comes to the printer 21, the user releases the hold mode of the cellular phone 9 if necessary. Then, the user inputs the password and presses "#1" on the operation panel of the cellular phone 9 in response to the initial audio guidance. It should be noted that if the cellular phone 9 is provided with a memory function, the user can register the password, so that there is no need for the user to input the password every time when requested.

The password is transmitted as a code signal to the printer 21 via the telephone line 10 and received by the printer 21 at the modem 5. Then, it is judged whether or not the received password is correct (S9). If the password is correct (S9:YES), it is judged whether or not '#1' is pressed after the password (S11). If so (S11:YES), then the printer 21 starts printing the document and deletes the print data from the RAM or the like. Then, the process is ended.

On the other hand, if it is judged that the received password is not correct (S9:NO), then, the audio guidance program outputs a second audio guidance announcing "PASSWORD IS NOT CORRECT. TO TRY AGAIN, ENTER YOUR PASSWORD, THEN PRESS '#1'. TO CANCEL THIS PROCESS, PRESS '#0'" (S15). In this way, the user is notified that the input password is incorrect, and determines whether or not to continue the current process. When the user presses '#1' (S17:YES), then the process returns to S9. If the user presses '#0' (S17: NO), then the process is ended.

As described above, the user can input the password from his or her own cellular phone 9 to the printer 21 so as to execute printing of the confidential document. Accordingly, there is no need to provide an additional external operation panel to the printer 21, so the number of component and manufacturing costs reduce, and spaces can be saved.

Next, a second example will be described for the electric device 1A shown in FIG. 2 while referring to FIGS. 9 to 12, and 19 and the flowchart of FIG. 27. A printer 21A shown in FIG. 9 has the similar configuration as the printer 21 except that the printer 21A does not include the modem 24, and the LAN interface 30 is connected to the telephone line 10 via a RAS server 31 provided on the LAN 25. With this configuration, the user of the cellular phone 9 instructs printing of the confidential document by remote log-in communication. In this case, the Web server application is previously stored in the ROM of the printer 21A.

With this configuration, the user of the PC 26 prepares a confidential document on the PC 26, and sends print data to the printer 21A in the same manner as described for the first example. The print data is then transmitted via the LAN 25 to the printer 21A and received at the LAN interface 30. The print data is stored into the RAM or the non-volatile memory. Because these processes are the same as those described for the first example, detailed explanation will be omitted.

Next, the user accesses to the homepage of the printer 21A from the cellular phone 9 in a well-known manner. That is, the user logs in the LAN 25 via the telephone line 10 and the RAS server 31, designates URL of the printer 21A from the browser, and accesses the homepage of the printer 21A.

Figure 27:
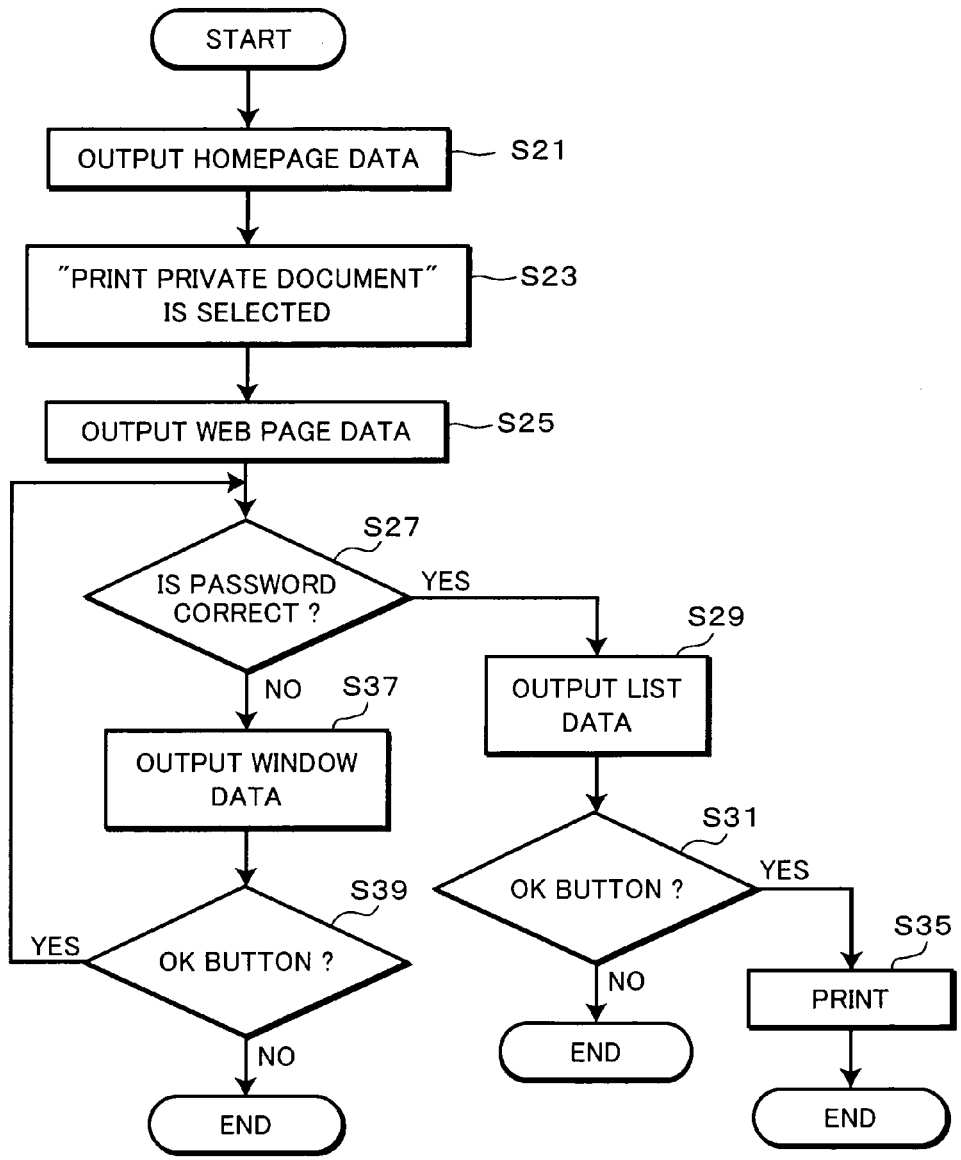
FIG. 27 is a flowchart representing a process executed in the printer of FIG. 9.

When the user accesses the homepage of the printer 21A, then the printer 21A executes a process shown in the flowchart of FIG. 27. That is, the printer 21A outputs homepage data (S21), so the monitor of the cellular phone 9 displays a print server homepage window 32 shown in FIG. 10. When the user selects "PRINT PRIVATE DOCUMENTS" on the print server homepage 32 (S23), the printer outputs Web page data (S25), so the monitor of the cellular phone 9 displays a window 33 shown in FIG. 11. The window 33 urges the user to input necessary personal information including user's name and password. The user inputs his or her name and the password through the operation panel of the cellular phone 9, then clicks an OK button 33a.

Then, the inputted personal information is transmitted to the printer 21A. It is judged whether or not the received password is correct (S27). The CPU of the printer 21A judges whether or not the password received from the cellular phone 23 is correct. If so (S27:YES), a list data is output (S29), so the cellular phone 9 displays a list window 34 shown in FIG. 12. The list window 34 displays a list of documents which have been generated by the user and are currently stored in the RAM of the printer 21A. Then, the user indicates desired one of the documents by checking a corresponding box 35. When the user presses an OK button 34a (S31:YES), then the printer 21A prints the selected document (S35), and the process is ended. If the user presses a cancel button 33b (S31:NO), then the present process is ended.

Figure 28:
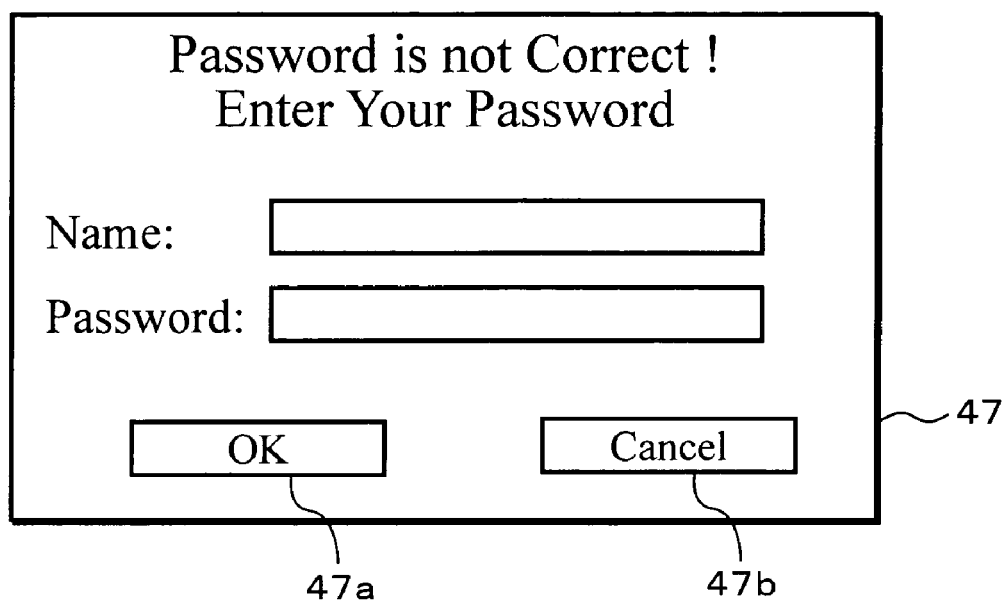
FIG. 28 is a plan view of a window displayed on a monitor of the cellular phone of FIG. 9.

On the other hand, if the received password is not correct (S27:NO), then window data is output (S37), so the monitor of the cellular phone 9 displays a window 47 shown in FIG. 28 so as to notify the user that the inputted password is not correct. If the user inputs his or her password and the like, and presses an OK button 47a, then the process returns to S27. If the user presses cancel button 47b (S39:NO), the process is ended.

As described above, according to the present invention, the user can make settings of the printer 21A through the cellular phone 9. Therefore, confidential printing can be performed in a simple and smooth manner.

It should be noted that it is possible to control the printer 21A to automatically send an e-mail message to the cellular phone 23 when printing of the confidential document is ready. That is, when command data is received, the e-mail detecting program stored in the ROM of the printer 21A is executed to detect the e-mail address indicated in the received command data. Then, when the confidential document is ready, the condition setting program automatically prepares and sends an e-mail message to the cellular phone 9. Accordingly, the e-mail message includes the URL of the printer 21A and notifies the user that the confidential printing is ready. The user accesses the homepage of the printer 21A by referring to the URL included in the received e-mail message. Then, the same process as described in the second example is performed.

Figure 13:
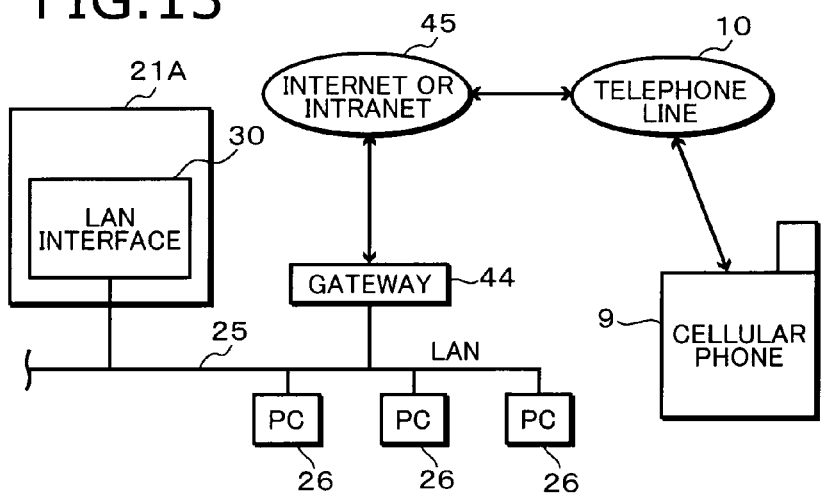
FIG. 13 is a block diagram of a printer as an example of the electric device of FIG. 3.

Next, a third example will be described for the electric device 1A of FIG. 3 while referring to FIG. 13. As shown in FIG. 13, the printer 21A is connected to the telephone line 10 via a gateway 44 and the Internet or Intranet 45. With this configuration, the user can access the homepage of the printer 21A using the cellular phone 9, and perform the above-described operation for controlling the printer 21A to execute the confidential printing.

Figure 14:
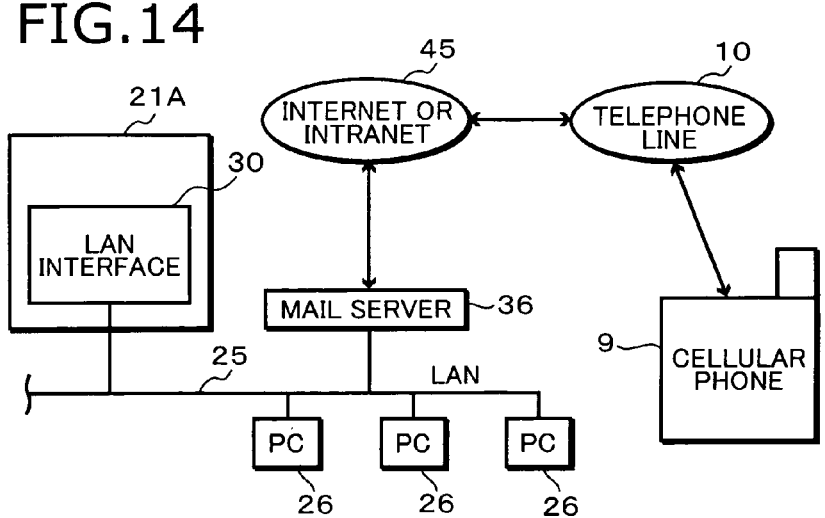
FIG. 14 is a block diagram of a printer as an example of the electric device of FIG. 4.

Next, a forth example will be described for the electric device 1A of FIG. 4 while referring to FIGS. 14 to 16. As shown in FIG. 14, the printer 21A is communicable with the cellular phone 9 via the LAN 25, a mail server 36, the Internet or Intranet 45, and the telephone line 10.

When the printer 21A receives the print data from the PC 26 and stores the document data into the RAM or the non-volatile memory in the same manner as described in the first example, then the e-mail address detecting program is executed to detect the e-mail address indicated in the command data appended to the print data, that is, the e-mail address of the cellular phone 9 in this example. Next, the condition setting program automatically prepares and sends an e-mail message shown in FIG. 15 to the cellular phone 9. The e-mail message notifies the user that the printing is ready, and also requests the user to input the password.

Then, the user inputs the password through the numeral keys and the like of the cellular phone 23 as shown in FIG. 16, and sends back the e-mail message to the printer 21A. If the input password is correct, the printer 21A starts printing the confidential document. If the password is not correct, then the printer 21A notifies the user that the password is not correct, and the user decides whether to continue or cancel the present process.

As described above, e-mail messages can be transmitted between the printer 21A and the cellular phone 23 by using the LAN interface 30 via the mail server 36 and the Internet or Intranet 45. With this configuration, the settings of the printer 21A including printing of a confidential document can be made using the e-mails. Therefore, the printer 21A can be reliably and easily controlled through the cellular phone 23.

It should be noted that it is preferable that as shown in FIG. 15 an ID code 37 be included in the e-mail messages, so that the series of the e-mail messages can be distinguished from any other e-mail message exchanged between the printer 21A and other cellular phones. The ID code 37 can be, for example, five digit number, such as "00001", which is automatically assigned at random by a program stored in the ROM of the printer 21A. By including the ID code into the e-mail messages, even when a plurality of e-mail messages are transmitted to and received from the cellular phone 23, each e-mail message can be distinguished from other e-mail messages. Therefore, each e-mail message can be processed without being mixed with other e-mail messages. This enables reliable control of the printer 21A, and printing of a confidential document can be performed in a simple and reliable manner.

Next, a fifth example will be described for the third embodiment while referring to FIG. 17. In the fifth example, a printer 21B shown in FIG. 17 is communicable with the cellular phone 9 via a pier-to-pier wireless communication, such as BlueTooth, without using the telephone line 10. The printer 21B includes both the LAN interface 30 and the BlueTooth interface 38. When the printer 21B receives the print data and stores the document data in the same manner as described above, then the printer 21B automatically sends the e-mail message to the user of the cellular phone 23. The remaining processes are the same as those described for the second example.

Next, a sixth example will be described while referring to FIG. 6. In the sixth example, the user can make various settings of the printer 21 through the cellular phone 23. In the configuration shown in FIG. 6, first, the user makes a telephone call to the printer 21 from the cellular phone 23. When the printer 21 detects an incoming call, then the printer 21 outputs an audio guidance announcing "TO SET PRINTER, PRESS '#1'. TO START CONFIDENTIAL DOCUMENT PRINTING, PRESS '#2'. TO CANCEL THIS PROCESS, PRESS '#0'". If the user presses '#2' in response to the audio guidance, then the printer 21 performs the further processes, such as inquiring the user's password, confirming the password, and executing confidential document printing.

On the other hand, if the user presses '#1' in response to the audio guidance, then the printer 21 outputs another voice message announcing, for example. "TO SELECT POWER SAVE MODE, PRESS '#1'. TO SELECT TONER SAVE MODE, PRESS '#2'. TO CANCEL THIS PROCESS, PRESS '#0'". Then, if the user presses '#1', the printer 21 outputs an audio message announcing, for example, "TO TURN ON THE POWER SAVE MODE, PRESS '#1'. TO TURN OFF THE POWER SAVE MODE, PRESS '#0'". If the user wishes to turn ON the power save mode, the user can press '#1'. Then, the printer 21 outputs the audio guidance announcing "SETTING IS COMPLETE. TO MAKE FURTHER SETTINGS, PRESS '#1', TO END THIS PROCESS, PRESS '#0'". If the user wishes to terminate the current processes, then the user can press '#0'. If the user wishes to make other settings, then the user can press '#1', so the printer 21 outputs the audio guidance once again, and continues the further process.

Figure 18:
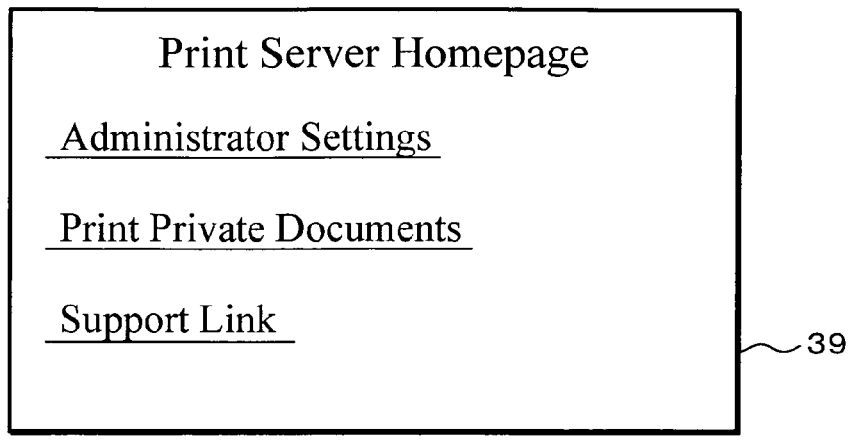
FIG. 18 is a plan view of a homepage window of the printer of FIG. 9.
Figure 19:
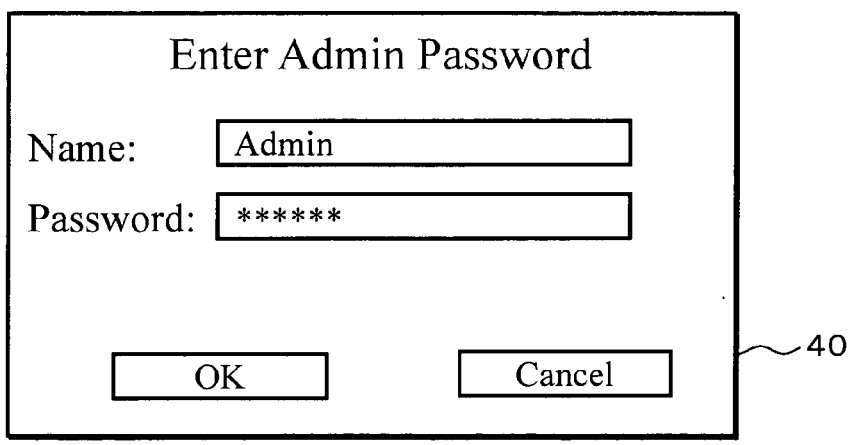
FIG. 19 is a plan view of a window displayed when a Administrator Settings on the homepage window of FIG. 18 is selected.
Figure 20:
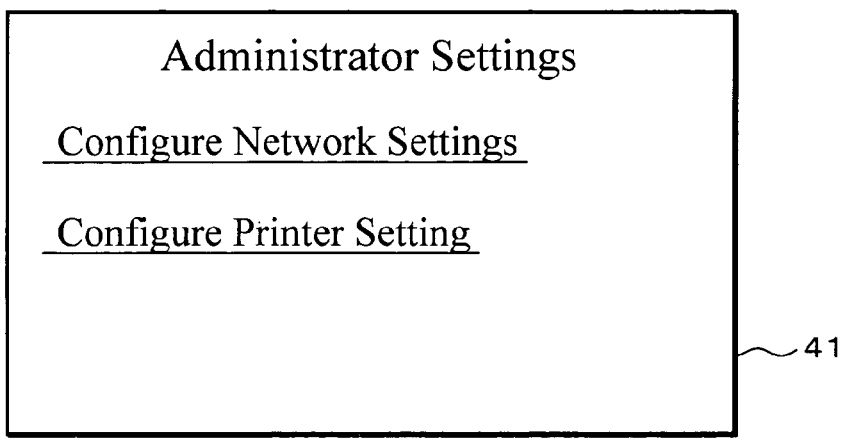
FIG. 20 is a plan view of a window displayed when an OK button on the window of FIG. 19 is pressed.
Figure 21:
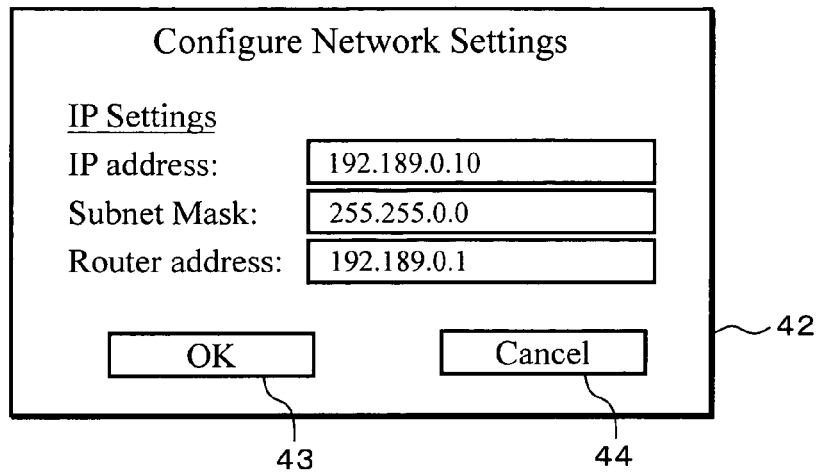
FIG. 21 is a plan view of a window displayed when a Configure Network Settings on the window of FIG. 20 is selected.
Figure 22:
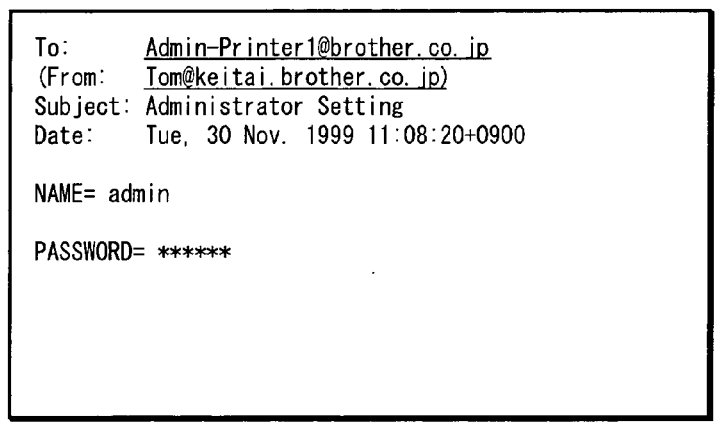
FIG. 22 is a plan view of an e-mail message sent from the cellular phone to the printer of FIG. 14.
Figure 29:
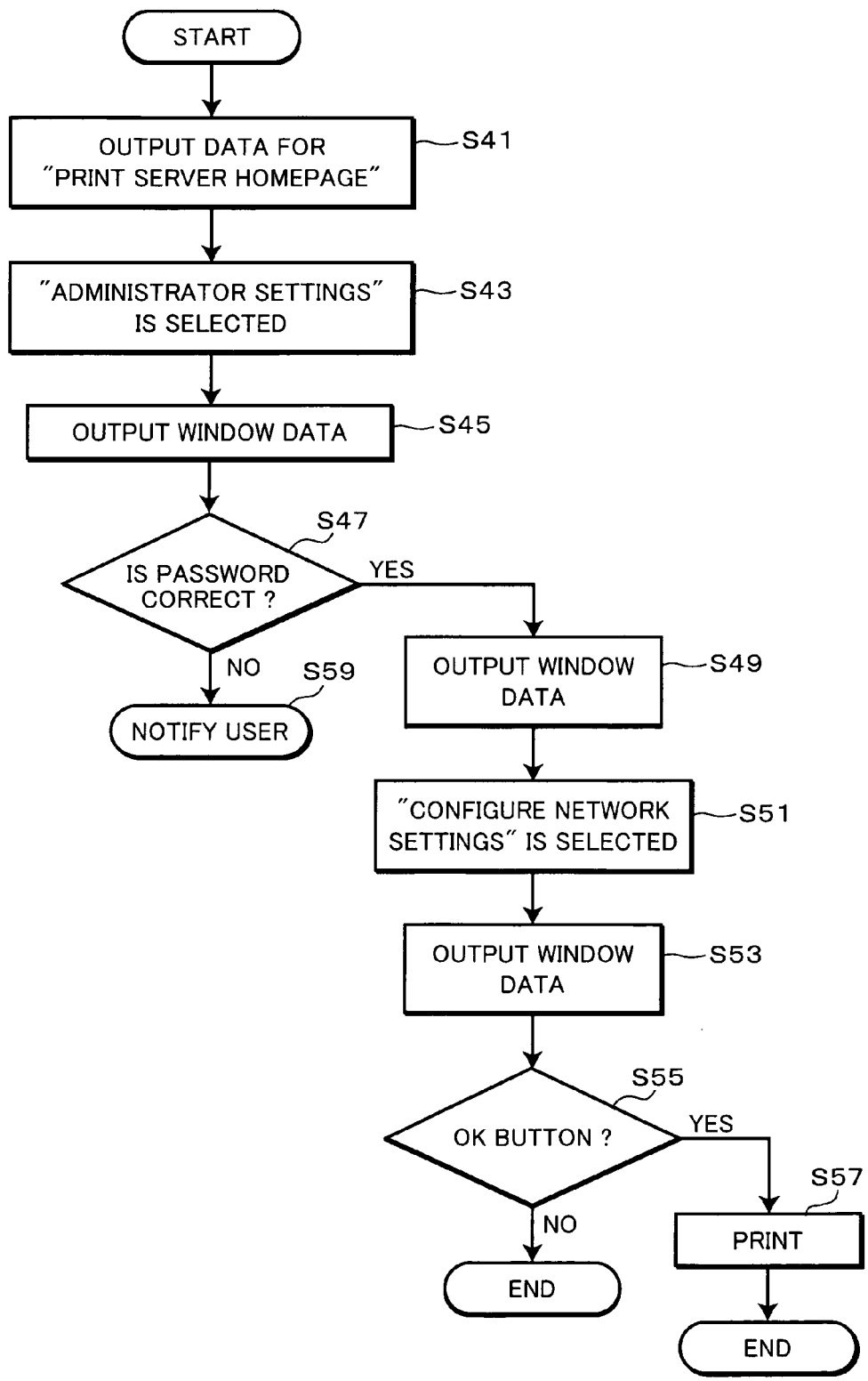
FIG. 29 is a flowchart representing a process executed by the printer of FIG. 9.

Next, a seventh example will be described while referring to FIGS. 9 and 18 to 21 and a flowchart of FIG. 29. In this example, the user makes settings of the printer 21A of FIG. 9 by accessing the homepage of the printer 21A through the cellular phone 9. First, the user logs in the LAN 25 from the cellular phone 9 via the telephone line 10 and the RAS server 31. The user specifies the URL of the printer 21A and accesses the homepage. Then, the printer 21A starts the following processes shown in the flowchart of FIG. 29. That is, first, a window data is output (S41), so a window 39 titled "Print Server Homepage" shown in FIG. 18 is displayed on the monitor of the cellular phone 9. When the user selects "Administrator Settings" on the window 39 (S43), then the corresponding window data is output (S45), so the monitor displays a window 40 shown in FIG. 19, urging the user to input his or her name and password. If the user inputs the correct password (S47:YES), then the corresponding window data is output (S49), so a window 41 shown in FIG. 20 is displayed on the monitor. The window 41 lists titles of various settings so that the user can select a desired one. When, the user selects "Configure Network Settings" (S51), for example, then a corresponding window data is output (S53), so a window 42 shown in FIG. 21 is displayed on the monitor. If the user presses the cancel button 44 (S55:NO), then the process is ended. If the user inputs required information and presses an OK button 43 (S55:YES), then the printing is performed (S57).

If the received password is not correct (S47:NO), then the printer 21A notifies the user that the password is incorrect (S59).

It should be noted that the same processes can be performed in the configuration shown in FIG. 17 where BlueTooth is used for communication.

Next, an eighth example will be described while referring to FIGS. 14, 22 to 25 and a flowchart shown in FIG. 30. In this example, the user makes setting of the printer 21A of FIG. 14 by exchanging e-mail messages using the cellular phone 9 of FIG. 14. First, the user prepares an e-mail message shown in FIG. 22. The e-mail message includes the password and other information required for the settings. Then, the user sends the e-mail message to the printer 21A. It should be noted that the printer 21A can be assigned with an e-mail address used for settings only, so that the printer 21 can instantly judge that e-mail messages sent to the e-mail address are about settings. Alternatively, the user may insert a predetermined keyword as a subject in order to indicate that the e-mail message is about settings of the printer 21A.

Figure 30:
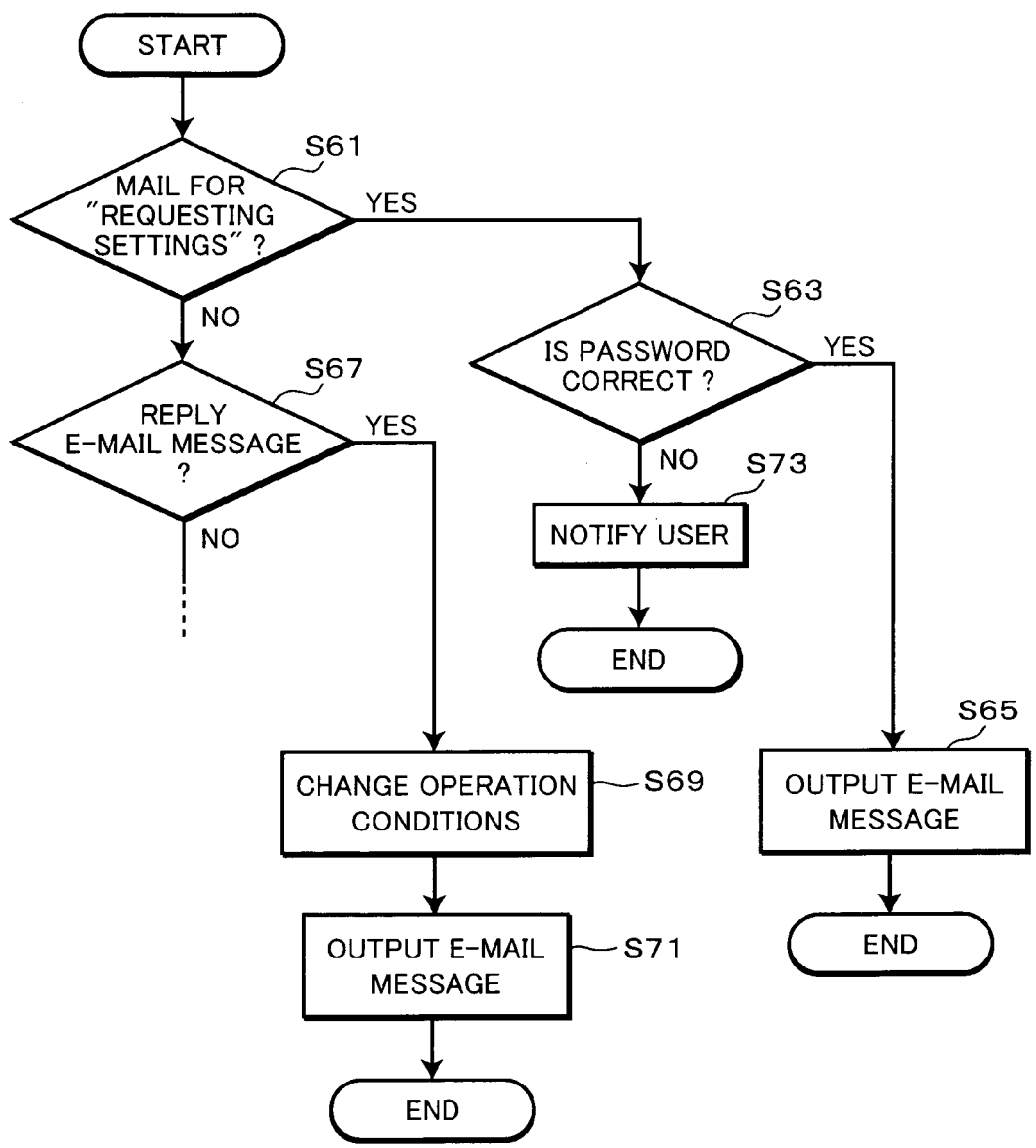
FIG. 30 a flowchart representing a process executed by the printer of FIG. 14.

When the printer 21A receives any e-mail message, then a following process shown in the flowchart of FIG. 30 is executed.

Figure 23:
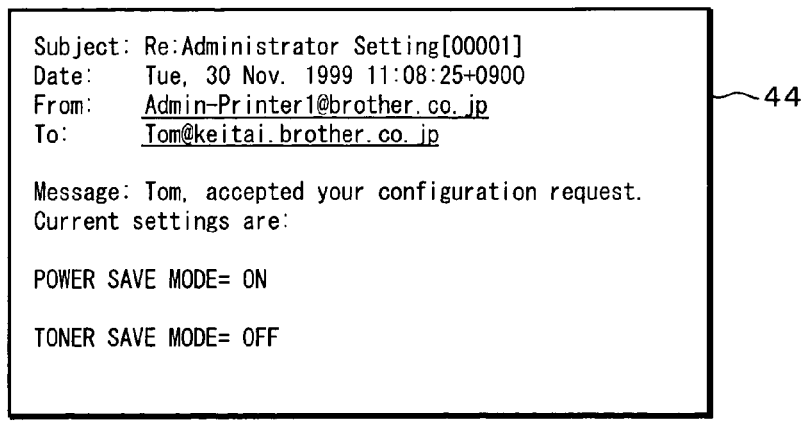
FIG. 23 is a plan view of an e-mail message sent from the printer to the cellular phone in response to the e-mail message of FIG. 22.

Because the received e-mail message is for requesting settings (S61:YES) in this example, it is judged whether or not the received password is correct (S63). If so (S63:YES), then, an e-mail message 44 shown in FIG. 23 is sent to the cellular phone 9 (S65), and the process is ended. The e-mail message 44 notifies the user of the current settings of the printer 21A. Then, the user changes settings indicated in the e-mail message 44 and prepares an reply e-mail message 45 shown in FIG. 24, and sends the e-mail message 45 to the printer 21A.

When the printer 21A receives the reply e-mail message 45 (S61:NO, S67:YES), then, the condition setting program changes the operation conditions and the like based on the contents of the replay e-mail message 45 (S69). Next, the condition setting program prepares and sends an e-mail message 46 shown in FIG. 25 to the user (S71). The e-mail message 46 indicates the changed settings. Then, the process is ended.

If the received password is not correct (S63:NO), then the condition setting program outputs an e-mail message notifying the user that the input password is not correct (S73).

As described above, the user can change and confirm the operation conditions of the printer 21A through his or own cellular phone 9. Therefore, there is no need to provide any additional operation panel to the printer 21A. Also, the user can change and confirm the operation condition of the printer 21A from a remote place without having to walk to the printer 21A. Moreover, because the cellular phone 9 is the user's own cellular phone, the user is familiar with and used to manipulating the cellular phone 9. Accordingly, the user can input necessary commands through the cellular phone 9 in an easy manner.

Further, because the cellular phone 9 is provided with alphanumeric keys, a display, an audio replay unit, and the like, the user can input required commands in an easy manner.

Although the above examples are described for when the electric device is a printer, this is not limitation of the present invention. For example, the electric device can be an embroidery sewing machine. In this case, for example, a user can generate embroidery data on a personal computer, output the embroidery data as confidential embroidery data to the embroidery machine, and control the embroidery sewing machine to perform an embroidery operation in response to data sent from the user through a cellular phone.

Also, the present invention can be applied to an electric device that has no operation panel of its own, and further to an electric device already provided with a highly equipped operation panel.

Figure 31:
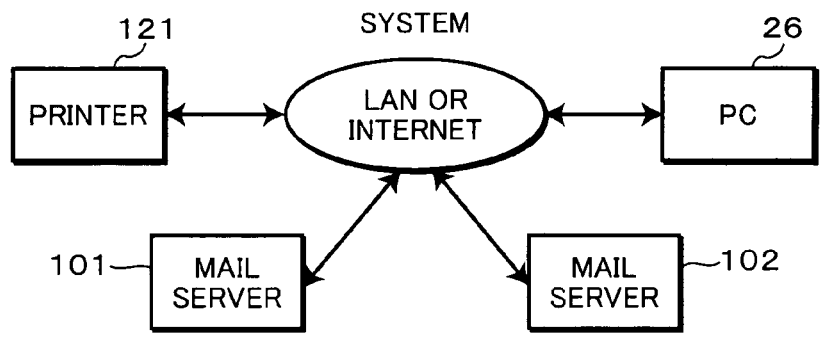
FIG. 31 is a block diagram of a system including a printer as an example of the electric device according to the embodiment of the present invention.

Next, detailed explanation for the e-mail address detecting program will be described while referring while referring to an example shown in FIG. 31. The e-mail address detecting program is executed for detecting an e-mail address from command data appended to print data, so that the condition setting program is able to automatically prepare and send an e-mail message to the detected e-mail address, for example. As shown in FIG. 31, a printer 121 is connected to a network 112 on which mail servers 101, 102 and a PC 26 are provided.

Figure 32:
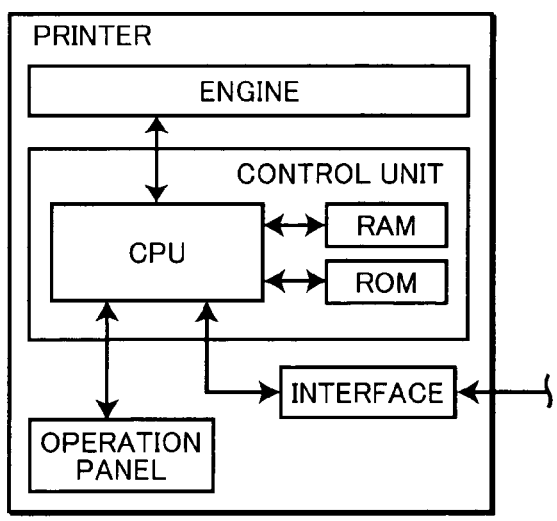
FIG. 32 is a block diagram showing a configuration of the printer of FIG. 31.

The network 112 can be a LAN, Internet, or the like which enables communication in accordance with a well-known protocol. A user account of the printer 121 is registered in the e-mail server 101, and a user account of the PC 26 is registered in the e-mail server 102. The printer 121 has a configuration similar to that of the printer 21A of FIG. 14. That is, as shown in FIG. 32, the printer 121 is provided with an engine 102, a control unit 103, an operation panel, and an interface 113. The control unit 103 includes a CPU 106, a RAM 107, and a ROM 108.

The ROM 107 stores an image forming program for forming images, an e-mail communication program for performing e-mail communication, and an e-mail address detection program for detecting an e-mail address from command data that was sent via means other than e-mail, and a variety of other programs. The ROM 107 also stores an e-mail communication program that automatically and regularly accesses the e-mail server 101 to receive e-mail messages designated to the printer 26 and stored in the e-mail server 101.

First, a process for sending an e-mail message in response to a print data sent on e-mail message will be described. First, the user of the PC 26 generates and sends print data as e-mail message to the e-mail address of the printer 121. An e-mail address of the PC user is included in the e-mail message also. The e-mail message is then transmitted via the mail server 102 and the network 112 to the e-mail server 101, and stored in the e-mail server 101. Meanwhile the e-mail communication program of the printer 121 accesses the e-mail server, and receives the e-mail message. Then, the printer 121 executes printing based on the received e-mail message. When printing is completed or when any error occurs during printing, then the e-mail communication program detects the e-mail address of the PC user from the e-mail message in a well-known manner, and sends an e-mail message to the PC user notifying the printing completion or error occurrence.

It should be noted that the PC user can include an e-mail address of any other person who may be in charge of the printer 121 in the e-mail message for example, other than his or her own e-mail address.

Next, a process for sending an e-mail message in response to a print data sent via any means other than e-mail will be described. Specifically, the operation will be described for when the print data is sent via a LPR or a server other than e-mail server through the LAN, such as Windows NT$^{RT}$ or Netware$^{RT}$. Because when the print data is sent via means other than e-mail, user's e-mail address is not sent along with the print data. Therefore, the above-described operation cannot be performed, so the operation described next is performed instead.

That is, print data sent to the printer 121 is appended with command data at the head or the tail of the print data. The command data indicates an e-mail address and request information the user wishes to receive from the printer 121. The request information can be selected from a print proceeding condition information, a print completion information, an error information, and the like. It should be noted that when the user wishes to receive an e-mail message from the printer 121 at the time of when the confidential document is ready as described above, the user can select a confidential printing information as the request information.

Specifically, for example, a print dialog of the PC 26 may include a property on which the user indicates an e-mail address and sets the request information. The e-mail address can be his or her own e-mail address, an e-mail address of a person who is in charge of the printer 121, or an e-mail address of any other person. At this time, the user may select the request information by checking on a corresponding check box on the print dialog, for example. In this manner, the user can reliably include an e-mail address and request information in the command data.

Moreover, the user can set his or her e-mail address for error information indicating errors which are easily recovered, such as paper jam and out-of-paper, and set an e-mail address of a person in charge of the printer 121 for error information indicating any other errors.

The user's own e-mail address is registered in the PC 26. Therefore, when the user wishes to receive information from the printer 121 at the PC 26, the user's e-mail address can be automatically included with the command data. In this manner, there is no need for the user to input the e-mail address each time the user generates a print job. This reduces the burden on the user.

When the print data is received by the printer 121 via any means other than e-mail as shown in FIG. 32, the e-mail address detection program stored in the ROM 107 detects the e-mail address and request information included in the command data appended to the print data. Then, any information requested by the request information is sent on e-mail to the detected e-mail address.

Figure 33:
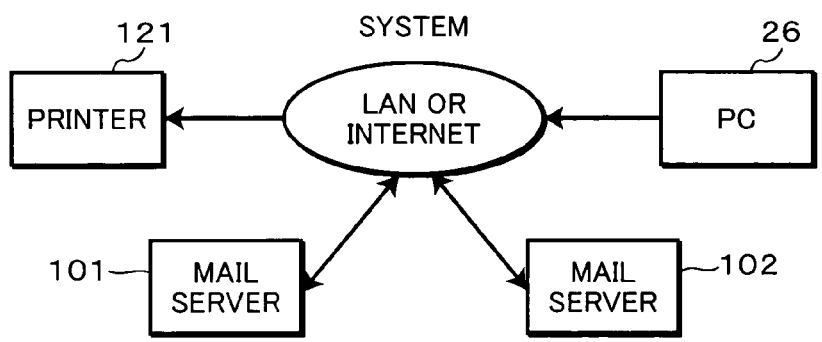
FIG. 33 is a block diagram of the system of FIG. 31 indicating a condition where print data is transmitted from a personal computer to the printer via a means other than e-mail.
Figure 34:
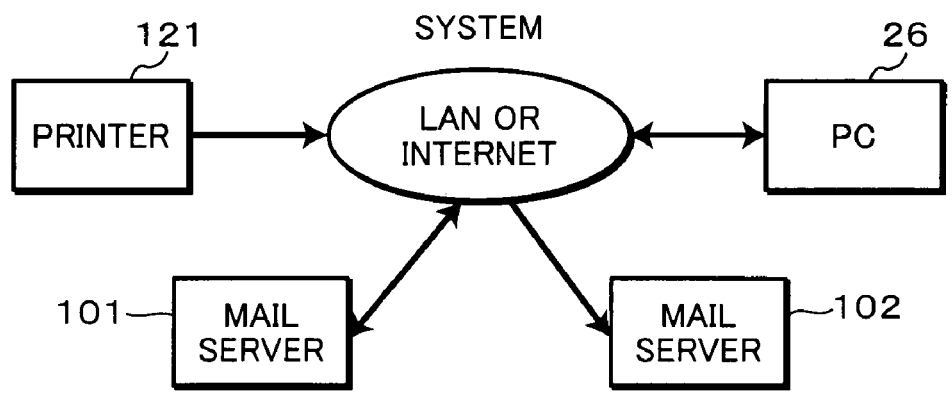
FIG. 34 is a block diagram of the system of FIG. 31 indicating a condition where an information is transmitted from the printer to an e-mail server.
Figure 35:
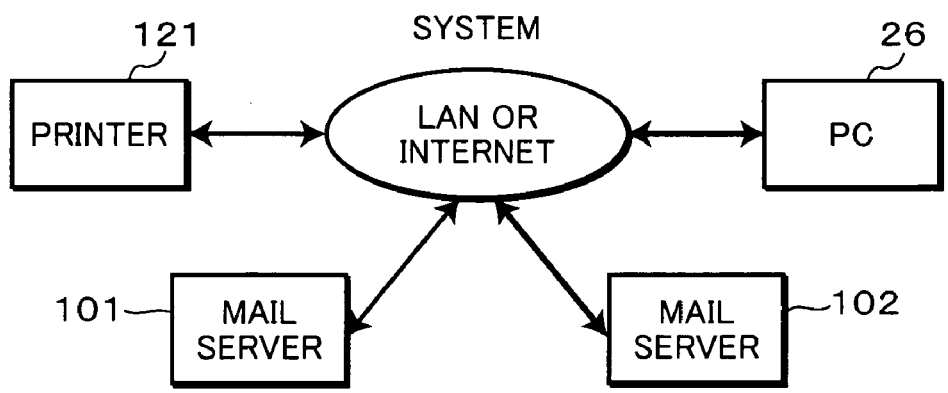
FIG. 35 is a block diagram of the system of FIG. 31 indicating a condition where the personal computer receives the information from the e-mail server.

Specifically, when the user's e-mail address is detected, the printer 121 sends necessary information on e-mail designated to the user's e-mail address. The e-mail message is transmitted via the e-mail server 101 and the network 112 to the e-mail server 102 as shown in FIG. 33, and is stored in the e-mail server 102. Next, the e-mail message is received by the PC 26 as shown in FIG. 34, so the user can view the contents of the e-mail message on a monitor of the PC 26. In this way, the user is notified of desired information, such as print completion, error occurrence, and the like.

When the detected e-mail address is the address of the person in charge of the printer 121, the e-mail message is transmitted to the person in the same manner.

When an e-mail message is generated and sent in the above-described manner from the printer 121, the PC 26 can receive the e-mail message without a port monitor software for supporting the special print protocol. Therefore, the configuration of the PC 26 can be simplified. Also, the user can reliably receive such an e-mail message at the PC 26 having the simple configuration.

In the above-described embodiment, the e-mail message is sent from the printer 121 to the detected e-mail address. However, the detected e-mail address can be displayed on a monitor display provided to the printer 121 without sending the e-mail message. Alternatively, the e-mail address can be printed out without sending the e-mail message.

Also, the image forming device of the present invention is not limited to the above-described printer. The present invention can be applied to any other image forming device, such as a printer including a scanner function, a facsimile function, a multifunction center function, and the like.

Also, although in the above-described embodiment, the user account of the printer 121 is registered in the e-mail server 101 and the user account of the PC 26 is registered in the e-mail server 102, the user account of the printer 121 and the user account of the PC 26 can be registered in a single e-mail server.

While the invention has been described in detail with reference to the specific embodiment thereof, it would be apparent to those skilled in the art that various changes and modifications may be made therein without departing from the spirit of the invention.

What is claimed is:

1. A control method of controlling an image forming device, comprising the steps of:
   a) receiving image information from an external device;
   b) storing the image information in a memory;
   c) after storing the image information in the memory, outputting to a cellular phone a signal indicating that the image information is stored in the memory;
   d) receiving an instruction to print the image information from the cellular phone after storing the image information in the memory, wherein the instruction is received from the cellular phone after the signal is outputted; and
   e) executing printing of the image information in accordance with the received instruction.

2. The control method according to claim 1, wherein the instruction from the cellular phone is an e-mail message transmitted in an e-mail format.

3. The control method according to claim 1, wherein the instruction from the cellular phone is transmitted via a Web service.

4. The control method according to claim 3, wherein the image forming device has a URL, and the instruction is transmitted to the image forming device when the cellular phone accesses the URL.

5. The control method according to claim 1, wherein the signal is transmitted via an audio guidance.

6. The control method according to claim 5, wherein the instruction from the cellular phone is transmitted in response to the audio guidance.

7. The control method according to claim 1, further comprising the steps of:
   f) detecting an e-mail address from the image information stored in the memory; and
   g) sending an e-mail message to the detected e-mail address, the e-mail message urging a user of the cellular phone to transmit the instruction to the image forming device.

8. The control method according to claim 1, further comprising a step of:
   h) judging whether the image information is confidential, wherein if the image information is confidential, executing printing when the instruction includes a predetermined code.

9. The control method according to claim 1, wherein the signal is output via an e-mail message capable of being received by the cellular phone, and, in response to the signal, the instruction is sent to the image forming device in an e-mail format.

10. The control method according to claim 1, wherein the signal identifies a URL associated with the image forming device, and the instruction is sent to the image forming device from the cellular phone by accessing the URL.

11. The control method according to claim 10, wherein the URL includes a link to a page to instruct the execution of the printing, and the instruction is sent to the image forming device from the cellular phone by accessing the link.

12. A printing system comprising:
   an image forming device, including:
      a receiving unit that receives an image information from an external device;
      a memory in which the image information is stored;
      an output unit that outputs a signal to a cellular phone after the image information is stored in the memory, the signal indicating that the image information is stored in the memory;
      a printing unit that executes printing of the image information; and
      a controller that controls the printing unit to execute the printing; and
   the cellular phone, including:
      a communication unit that transmits an instruction to the image forming device after the image information is stored in the memory of the image forming device, and the communication unit transmits the instruction to the image forming device after receiving the signal output from the output unit of the image forming device;
   wherein the controller controls the printing unit to execute the printing when the instruction is transmitted from the cellular phone.

13. The printing system according to claim 12, wherein the instruction from the cellular phone is an e-mail message transmitted in an e-mail format.

14. The printing system according to claim 12, wherein the instruction from the cellular phone is transmitted via a Web service.

15. The printing system according to claim 14, wherein the image forming device has a URL associated therewith, and the instruction is transmitted to the image forming device when the cellular phone accesses the URL.

16. The printing system according to claim 12, wherein the signal is transmitted via an audio guidance.

17. The printing system according to claim 16, wherein the instruction from the cellular phone is transmitted in response to the audio guidance.

18. The printing system according to claim 12, further comprising an e-mail address detector for detecting an e-mail address from the image information stored in the memory, wherein an e-mail message is sent to the detected e-mail address, the e-mail message urging a user of the cellular phone to transmit the instruction to the image forming device.

19. The printing system according to claim 12, wherein the image forming device determines whether the image information is confidential and the printing is executed when the instruction including a predetermined code is transmitted from the cellular phone.

20. The printing system according to claim 12, wherein the signal is output via an e-mail message to a detected e-mail address such that the e-mail message can be received via the cellular phone, and, in response to the e-mail message, the instruction is sent to the image forming device in an e-mail format.

21. The printing system according to claim 12, wherein the signal identifies a URL and the signal is sent to a detected e-mail address, and the instruction is sent to the image forming device from the cellular phone by accessing the URL.

22. The printing system according to claim 12, wherein the URL includes a link to a page to instruct execution of the printing, and the instruction is sent to the image forming device from the cellular phone by accessing the link.

23. The control method according to claim 1, further comprising the steps of:

f) detecting telephone number from the image information stored in the memory; and g) making a telephone call to the detected telephone number, the telephone call including audio guidance urging a user of the cellular phone to transmit the instruction to the image forming device.

* * * * *